United States Patent
Pietraszak

(10) Patent No.: US 7,283,724 B2
(45) Date of Patent: *Oct. 16, 2007

(54) REWIND AND FAST-FORWARD FOR ENHANCED TELEVISION

(75) Inventor: Michael E. Pietraszak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

This patent is subject to a terminal disclaimer.

(21) Appl. No.: 10/983,208

(22) Filed: Nov. 5, 2004

(65) Prior Publication Data

US 2005/0094970 A1    May 5, 2005

Related U.S. Application Data

(63) Continuation of application No. 09/681,355, filed on Mar. 24, 2001, now Pat. No. 6,847,779.

(51) Int. Cl.
*H04N 5/91* (2006.01)

(52) U.S. Cl. ............................................ 386/68; 386/95

(58) Field of Classification Search ................. 386/46, 386/68, 80, 81, 95, 98, 111, 112, 125
See application file for complete search history.

(56) References Cited

U.S. PATENT DOCUMENTS

| | | | | |
|---|---|---|---|---|
| 5,771,331 A | * | 6/1998 | Aoki et al. | 386/68 |
| 5,809,201 A | * | 9/1998 | Nagasawa | 386/68 |
| 5,949,953 A | * | 9/1999 | Shirakawa et al. | 386/70 |

* cited by examiner

*Primary Examiner*—Huy Nguyen
(74) *Attorney, Agent, or Firm*—Workman Nydegger

(57) ABSTRACT

Fast-forwarding and rewinding within a compressed video stream and a corresponding content stream of pages are disclosed. The compressed video stream is made up of intra frames, predictive frames; and bi-directional frames. The content stream has a number of trigger pages and/or script pages. An intra frame is skipped to within the video stream, and the trigger page closest to this frame is skipped to within the content stream. Alternatively, the script page closest to the frame that is not further ahead of it is skipped to within the content stream. This page is executed until the content stream is aligned with the video stream.

40 Claims, 3 Drawing Sheets

REWIND AND FAST-FORWARD FOR ENHANCED TELEVISION

CROSS-REFERENCE TO RELATED APPLICATIONS

The present application is a continuation application of commonly-assigned U.S. patent application Ser. No. 09/681,355 filed Mar. 24, 2001 now U.S. Pat. No. 6,847,779, entitled "Rewind and Fast-Forward for Enhanced Television" and which is incorporated herein by reference.

BACKGROUND OF THE INVENTION

1. The Field of the Invention

This invention relates generally to enhanced television, such as a video stream compressed according to a Moving Pictures Expert Group (MPEG) standard, and a corresponding content stream of pages in a markup language format. More particularly, the invention relates to rewinding and fast-forwarding within the video stream and the corresponding content stream.

2. Background and Relevant Art

The video and computer industries are working towards achieving convergence in the television space. This means, among other things, that television and computer content will become integrated. One type of convergence is enhanced television. In enhanced television generally, a compressed video stream is enhanced with a corresponding content stream. The television viewer can watch the video stream as he or she normally watches television, but can also interact with the content stream. For example, while a baseball game is being displayed within the video stream, the content stream may show some information regarding the player currently at bat. The viewer may be able to select hyperlinks within the content stream to view other information regarding the player or his team, or other information. The ability of the viewer to select links within the content stream enhances the television-viewing experience.

Video streams are usually compressed according to known MPEG standards, such as the MPEG-1 or MPEG-2 standards. Content streams can be a series of pages in a known markup language that correspond to the video streams. For example, the markup language may be the HyperText Markup Language (HTML), the eXtended Markup Language (XML), or another markup language. Content streams that have pages according to a known markup language have the benefit of being interactive, because links on the pages can be selected by users. Pages formatted according to markup languages can also easily be viewed. For example, web browser computer programs and web browser operating system components that permit viewing of such pages are widely available.

A disadvantage with enhanced television in general is that it does not provide for rewinding and fast-forwarding within both the compressed video stream and the corresponding content stream. Skipping within the compressed video stream alone is difficult. Since the video stream is compressed, it is difficult to go back within the stream. Corresponding rewinding and fast-forwarding within the content stream makes the problem more difficult. Skipping within the content stream, for instance, should be aligned with skipping within the video stream. For these and other reasons, there is a need for the present invention.

BRIEF SUMMARY OF THE INVENTION

The invention relates to fast-forwarding and rewinding within a compressed video stream and a corresponding content stream of pages. The compressed video stream is made up of intra frames, predictive frames, and bi-directional frames. The content stream has a number of trigger pages and/or script pages. One embodiment of the invention skips within the video stream to an intra frame, and then skips within the content stream to a trigger page closest to this intra frame. Another embodiment also skips within the video stream to an intra frame, but skips within the content stream to a script page closest to the intra frame that is no further ahead than the intra frame.

The script page is executed until the content stream is aligned with the video stream. In the case of time-based script pages, time delays within the scripts are eliminated, or a new clock faster than the standard clock is used to proceed through the scripts quickly.

Methods of varying scopes are encompassed by the invention. Other aspects, embodiments and advantages of the invention, beyond those described here, will become apparent by reading the detailed description and by referencing the drawings.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Example Compressed Video Stream and Content Stream

Figure 1:
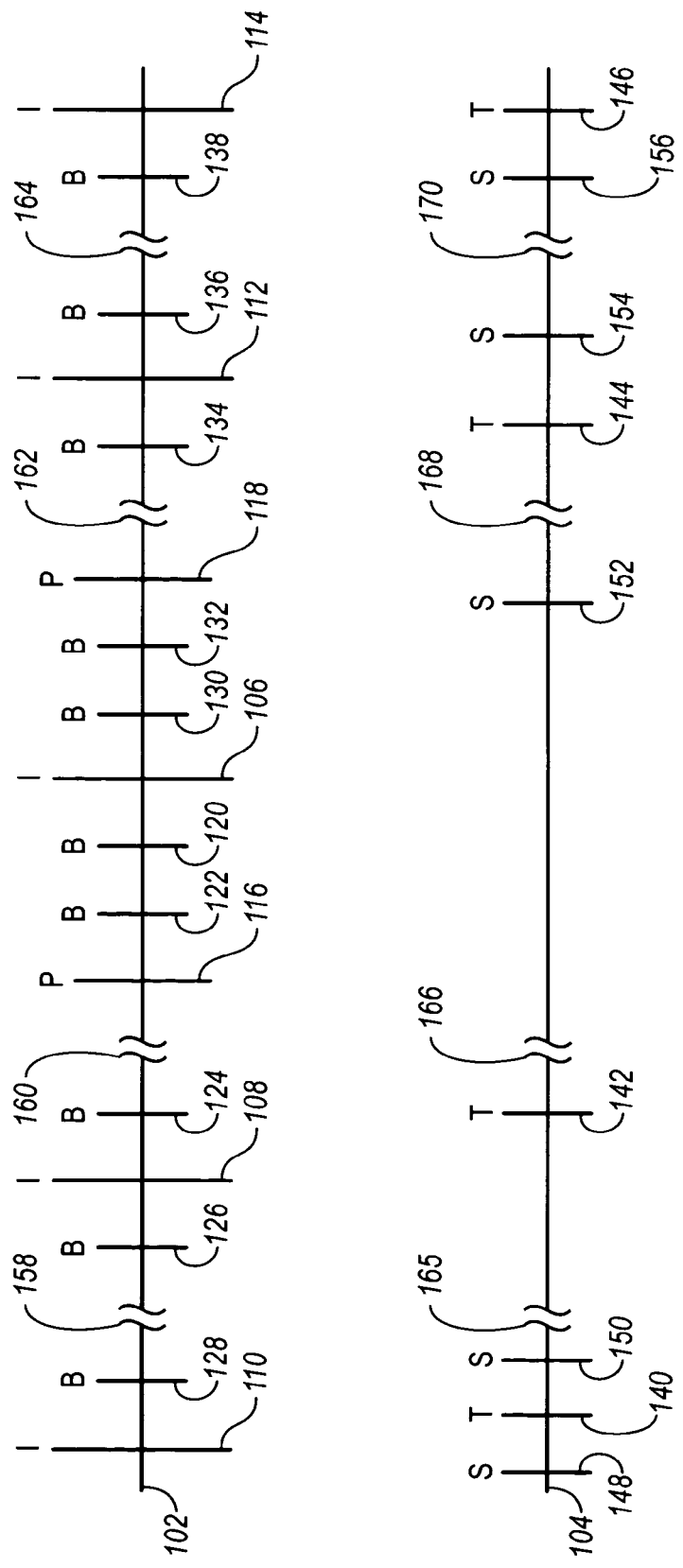
FIG. 1 is a diagram showing an example compressed video stream and a corresponding example content stream, upon which the invention is operable.

FIG. 1 shows a diagram 100 of an example compressed video stream 102 and a corresponding example content stream 104. The invention is operable on the example streams 102 and 104. Preferably, the video stream 102 is compressed according to the known MPEG-1 standard. MPEG-1 video streams have three types of coded frames, intra (I) frames, predicted (P) frames, and bi-directional (B) frames. In general, the sequence of frames is IBBPBBPBBPBBIBBPBBPBBPBB, et seq. An I frame is coded as a still image, not using any past history. A P frame is predicted from the most recently reconstructed I or P frame. A B frame is predicted from the closest two I or P frames one in the past, and one in the future. The video stream 102 specifically has I frames 106, 108, 110, 112, and 114, and P frames 116 and 118. The stream 102 also specifically has B frames 120, 122, 124, 126, 128, 130, 132, 134, 136, and 138. Breaks 158, 160, 162, and 164 within the video stream 102 are placeholders indicating parts of the stream 102 not shown in FIG. 1.

Preferably, the content stream 104 has a number of pages formatted according to a known markup language. For example, the markup language can be HTML, XML, or another markup language. Only two types of pages within the stream 104 are specifically called out in FIG. 1, trigger pages, and script pages. The content stream 104 has trigger pages 140, 142, 144, and 146, and script pages 148, 150, 152, 154, and 156. A script page is a page that has an executable script. When processing of the content stream 104 reaches a script page, the page's script is executed. The script can be time-based. A time-based script is a script that has one or more time delays.

Alternatively, a time-based script is a script where execution is measured against a clock, such as an internal system clock. Breaks 165, 166, 168, and 170 within the content stream 104 are placeholders indicating parts of the stream 104 not shown in FIG. 1. They correspond to the breaks 158, 160, 162, and 164, respectively, of the video stream 102.

Playback of the video stream 102 is typically accomplished from left to right in a forward temporal direction. The frames of the stream 102 are decoded and played back according to a predetermined frame rate, such as thirty frames-per-second. As an example, the video stream 102 may represent a television program that is displayed on the screen of a television set. The content stream 104 is correspondingly played back in conjunction with playback of the video stream 102. As an example, the content stream 104 may represent additional content regarding the television program that is displayed in a special area of the screen of the television set. The content stream 104 is preferably interactive. For example, the pages of the content stream 104 may have hyperlinks that can be selected by the viewer while viewing the television program represented by the video stream 102. The next sections of the detailed description describe how the streams 102 and 104 can be skipped within, to achieve fast-forwarding and rewinding.

Rewind and Fast-Forward Using Trigger Pages

Figures 2, 3:
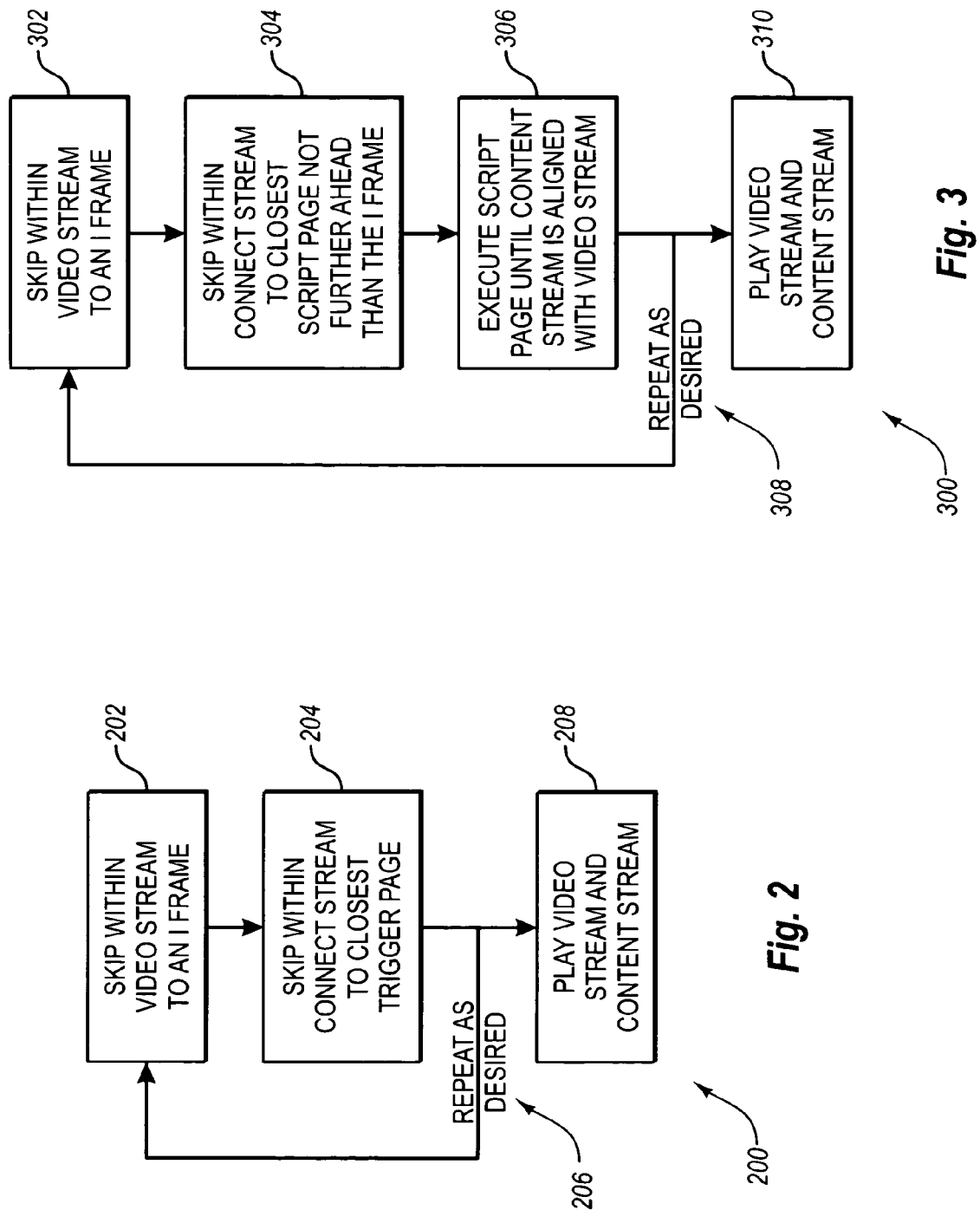
FIG. 2 is a flowchart of a method for rewinding and fast-forwarding within a compressed video stream and a corresponding content stream of pages, according to an embodiment of the invention.
FIG. 3 is a flowchart of a method for rewinding and fast-forwarding within a compressed video stream and a corresponding content stream of pages, according to another embodiment of the invention.

FIG. 2 is a flowchart of a method 200 showing how one embodiment of the invention achieves rewinding and fast-forwarding within a compressed video stream and a corresponding content stream. For example, the compressed video stream and the corresponding content stream can be the streams 102 and 104, respectively, of FIG. 1. In 202, the method 200 skips within the video stream from a current frame to an I frame. The skipping can be forward or backward, to achieve fast-forwarding or rewinding, respectively, within the stream. In 204, the method 200 skips within the content stream to the trigger page that is closest to the I frame skipped to in 202. As indicated by the arrow 206, performing 202 and 204 can be repeated as desired. In 208, the video stream and the content stream, as have been skipped to, are played.

As an example of rewinding within a compressed video stream and a corresponding content stream by performing the method 200, reference is made to FIG. 1. The I frame 106 is for sake of example the current frame within the video stream 102. The I frame 108 is skipped back to within the video stream 102, and the trigger page 142 is skipped back to within the content stream 104 as the closest trigger page to the I frame 108. If further rewinding is desired, the I frame 110 can be skipped back to within the video stream 102, with the trigger page 140 skipped back to within the content stream 104. Once rewinding has stopped, the streams 102 and 104, as have been skipped back to, are played.

As example of fast-forwarding within a compressed video stream and a corresponding content stream by performing the method 200 of FIG. 2, reference is also made to FIG. 1. The I frame 106 is the current frame within the video stream 102. The I frame 112 is skipped forward to within the video stream 102, and the trigger page 144 is skipped forward to within the content stream 104 as the closest trigger page to the I frame 112. If further fast-forwarding is desired, the I frame 114 can be skipped forward to within the video stream 102, with the trigger page 146 skipped forward to within the content stream 104. Once fast-forwarding has stopped, the streams 102 and 104, as have been skipped forward to, are played.

Rewind and Fast-Forward Using Script Pages

FIG. 3 is a flowchart of a method 300 showing how another embodiment of the invention achieves rewinding and fast-forwarding within a compressed video stream and a corresponding content stream. For example, the compressed video stream and the corresponding content stream can be the streams 102 and 104, respectively, of FIG. 1. In 302, the method 300 skips within the video stream from a current frame to an I frame. The skipping can be forward or backward, to achieve fast-forwarding or rewinding, respectively, within the stream. In 304, the method 300 skips within the content stream to the script page that is closest to the I frame skipped to in 202, but which is not further ahead in a temporal direction than the I frame. In 306, the script page skipped to in 304 is executed until the content stream is aligned temporally with the video stream. As indicated by the arrow 308, performing 302, 304, and 306 can be repeated as desired. In 310, the video stream and the content stream, as both have been skipped to and as the script page of the latter has also been executed, are played.

The script page of the content stream skipped to in 304 and executed in 306 can be a time-based script page. In such an instance, the delays within the page are eliminated during execution in 306, so that the content stream can quickly be temporally aligned with the video stream. Alternatively, the script page is executed against a new clock that is faster than the standard clock, such as a system clock, to also quickly align the content stream temporally with the video stream. For example, the script page may have delays that are measured against the system clock. By substituting a new clock that is faster than the system clock, the script page executes more quickly.

As an example of rewinding within a compressed video stream and a corresponding content stream by performing the method 300, reference is made to FIG. 1. The I frame 106 is for sake of example the current frame within the video stream 102. The I frame 108 is skipped back to within the video stream 102. The script page 150 is skipped back to within the content stream 104 as the closest script page to the I frame 108 that is not further ahead temporally than the I frame 108. The script page 150 is executed until the content stream 104 is aligned temporally with the video stream 102. If further rewinding is desired, the I frame 110 can be skipped back to within the video stream 102, with the script page 148 skipped back to within the content stream 104. The script page 148 is executed until the content stream 104 is aligned temporally with the video stream 102. Either the script page 150 or 148 can be a time-based script page. Once rewinding has stopped, the streams 102 and 104, as have been skipped back to, are played.

As an example of fast-forwarding within a compressed video stream and a corresponding content stream by performing the method 300, reference is also made to FIG. 1. The I frame 106 is the current frame within the video stream 102, and the I frame 112 is skipped forward to within the stream 102. The script page 152 is skipped forward to within the content stream 104 as the closest script page to the I frame 112 that is not further ahead temporally than the I frame 112. The script page 152 is executed until the content stream 104 is aligned temporally with the video stream 102. If further fast-forwarding is desired, the I frame 114 can be skipped forward to within the video stream 102, with the script page 156 skipped forward to within the content stream 104. The script page 156 is executed until the streams 102 and 104 are aligned temporally. Either the script page 152 or 156 can be a time-based script page. Once fast-forwarding has stopped, the streams 102 and 104, as have been skipped forward to, are played.

Example Computerized Device

Figure 4:
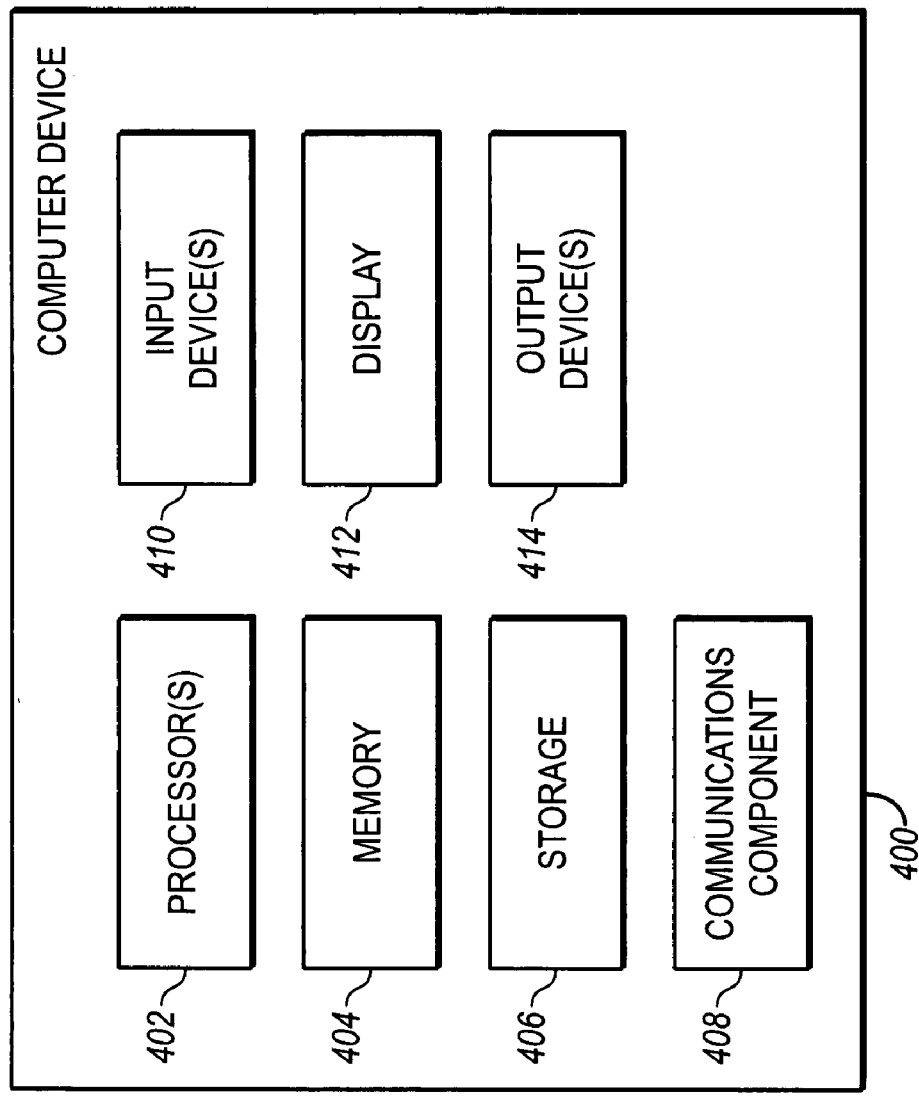
FIG. 4 is a diagram of an example computerized device that can be used to implement the invention.

The invention can be implemented within a computerized environment having one or more computerized devices. The diagram of FIG. 4 shows an example computerized device 400. The example computerized device 400 can be, for example, a desktop computer, a laptop computer, or a personal digital assistant (PDA). The invention may be practiced with other computer system configurations as well, including multiprocessor systems, microprocessor-based or programmable consumer electronics, network computers, minicomputers, and mainframe computers. The invention may be practiced in distributed computing environments where tasks are performed by remote processing devices that are linked through a communications network. The device 400 includes one or more of the following components: processor(s) 402, memory 404, storage 406, a communications component 408, input device(s) 410, a display 412, and output device(s) 414. For a particular instantiation of the device 400, one or more of these components may not be present. For example, a PDA may not have any output device(s) 414. The description of the device 400 is to be used as an overview of the types of components that typically reside within such a device, and is not meant as a limiting or exhaustive description.

The processor(s) 402 may include a single central-processing unit (CPU), or a plurality of processing units, commonly referred to as a parallel processing environment. The memory 404 may include read-only memory (ROM) and/or randomaccess memory (RAM). The storage 406 may be any type of storage, such as fixed-media storage devices and removable-media storage devices. Examples of the former include hard disk drives, and flash or other non-volatile memory. Examples of the latter include tape drives, optical drives like CD-ROM drives, and floppy disk drives. The storage devices and their associated computer-readable media provide non-volatile storage of computer-readable instructions, data structures, program modules, and other data. Any type of computer-readable media that can store data and that is accessible by a computer can be used.

The device 400 may operate in a network environment. Examples of networks include the Internet, intranets, extranets, local-area networks (LAN's), and wide-area networks (WAN's). The device 400 may include a communications component 408, which can be present in or attached to the device 400. The component 408 may be one or more of a network card, an Ethernet card, an analog modem, a cable modem, a digital subscriber loop (DSL) modem, and an Integrated Services Digital Network (ISDN) adapter. The input device(s) 410 are the mechanisms by which a user provides input to the device 400. Such device(s) 410 can include keyboards, pointing devices, microphones, joysticks, game pads, and scanners. The display 412 is how the device 400 typically shows output to the user. The display 412 can include cathode-ray tube (CRT) display devices and flat-panel display (FPD) display devices. The device 400 may provide output to the user via other output device(s) 414. The output device(s) 414 can include speakers, printers, and other types of devices.

The methods that have been described can be computer-implemented on the device 400. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A computer program product comprising one or more computer-readable storage media storing computer-executable instructions which, when executed by a computing system, implement a method operable on a compressed video stream having a number of intra frames, a number of predictive frames, and a number of bi-directional frames, and on a content stream of pages corresponding to the video stream and having at least a number of trigger pages, the method comprising:

skipping with the video stream from a current frame of the video stream to an intra frame; and, skipping within the content stream to a trigger page closest to the intra frame.

2. The computer program product of claim 1, wherein the intra frame is a previous intra frame.

3. The computer program product of claim 2, further comprising:

skipping back within the video stream to a further previous intra frame; and skipping back within the content stream to a trigger page closest to the further previous intra frame.

4. The computer program product of claim 3, further comprising playing the video stream and the content stream as skipped back to.

5. The computer program product of claim 1, wherein the intra frame is a subsequent intra frame.

6. The computer program product of claim 5, further comprising:
skipping forward within the video stream to a further subsequent intra frame; and
skipping forward within the content stream to a trigger page closest to the further subsequent intra frame.

7. The computer program product of claim 6, further comprising playing the video stream and content stream as skipped forward to.

8. The computer program product of claim 1, further comprising playing the video stream and the content stream as skipped to.

9. A computer program product comprising one or more computer-readable storage media storing computer-executable instructions which, when executed by a computing system, implement a method operable on a compressed video stream having a number of intra frames, a number of predictive frames, and a number of bi-directional frames, and on a content stream of pages corresponding to the video stream and having at least a number of script pages, the method comprising:
skipping within the video stream from a current frame of the video stream to an intra frame;
skipping within the content stream to a script page closest to the intra frame that is no further ahead than the intra frame; and
executing the script page until the content stream is aligned with the video stream.

10. The computer program product of claim 9, wherein the script page is a time-based script page.

11. The computer program product of claim 9, wherein executing the script page comprises executing the time-based script page with a new clock faster than a standard clock.

12. The computer program product of claim 9, wherein executing the script page comprises executing the time-base script page such that delays within the time-based script page are eliminated.

13. The computer program product of claim 9, wherein the intra frame is a previous intra frame.

14. The computer program product of claim 9, further comprising:
skipping back within the video stream to a further previous intra frame;
skipping back within the content stream to a script page closest to the further previous intra frame that is no further ahead than the further previous intra frame; and
executing the script page until the content stream is aligned with the video stream.

15. The computer program product of claim 14, further comprising playing back the video stream and content stream as skipped back to.

16. The computer program product of claim 14, wherein the script page is a time-based script page, and executing the script page comprises executing the time-based script page with a new clock faster than a standard clock.

17. The computer program product of claim 14, wherein the script page is a time-based script page, and executing the script page comprises executing the time-based script page such that delays within the time-based script page are eliminated.

18. The computer program product of claim 9, wherein the intra frame is a subsequent intra frame.

19. The computer program product of claim 18, further comprising:
skipping forward within the video stream to a further subsequent intra frame;
skipping forward within the video stream to a script page closest to the further
subsequent intra frame that is no further ahead than the further subsequent intra frame; and,
executing the script page until the content stream is aligned with the video stream.

20. The computer program product of claim 19, further comprising playing back the video stream and the content stream as skipped forward to.

21. The computer program product of claim 19, wherein the script page is a time-based script page, and executing the script page comprises executing the time-based script page with a new clock faster than a standard clock.

22. The computer program product of claim 19, wherein the script page is a time-based script page, and executing the script page comprises executing the time-based script page such that delays within the time-based script page are eliminated.

23. The computer program product of claim 9, further comprising playing the video stream and the content stream as skipped to.

24. A computer program product comprising one or more computer-readable storage media storing computer-executable instructions which, when executed by a computing system, implement a method operable on a compressed video stream having an umber of intra frames, a number of predictive frames, and a number of bi-directional frames, and on a content stream of pages corresponding to the video stream and having a number of trigger pages and a number of script pages, the method comprising:
skipping within the video stream from a current frame of the video stream to an intra frame; and,
skipping within the content stream to one of a trigger page and a script page closest to the intra frame.

25. The computer program product of claim 24, wherein skipping within the content stream comprises skipping to the trigger page.

26. The computer program product of claim 24, wherein skipping within the content stream comprises skipping to the script page, and the method further comprises executing the script page until the content stream is aligned with the video stream.

27. The computer program product of claim 26, wherein the script-page is a time-based script page.

28. The computer program product of claim 27, wherein executing the script page comprises executing the time-based script page with a new clock faster than a standard clock.

29. The computer program product of claim 27, wherein executing the script page comprises executing the time-based script page such that delays within the time-based script page are eliminated.

30. The computer program product of claim 27, wherein the intra frame is a previous intra frame.

31. The computer program product of claim 27, wherein the intra frame is a subsequent intra frame.

32. The computer program product of claim 27, further comprising playing the video stream and the content stream as skipped to.

33. A method operable on a compressed video stream having a number of intra frames, a number of predictive frames, and a number of bi-directional frames, and on a content stream of pages corresponding to the video stream and having at least a number of script pages, the method comprising:

skipping within the video stream from a current frame of the video stream to one other frame of the video stream;

upon skipping within the video stream, skipping the content stream into temporal alignment with the video stream.

34. A method as recited in claim 33, wherein said one other frame of the video stream is an intra frame and wherein skipping the content stream into temporal alignment with the video stream includes:

skipping within the content stream to a script page closest to the intra frame that is no further ahead than the intra frame; and executing the script page until the content stream is aligned with the video stream.

35. A method as recited in claim 33, wherein skipping comprises fast-forwarding.

36. A method as recited in claim 33, wherein skipping comprises rewinding.

37. A computer program product comprising one or more computer-readable storage media storing computer-executable instructions which, when executed by a computing system, implement a method operable on a compressed video stream having a number of intra frames, a number of predictive frames, and a number of bi-directional frames, and on a content stream of pages corresponding to the video stream and having at least a number of script pages, the method comprising:

skipping within the video stream from a current frame of the video stream to one other frame of the video stream;

upon skipping within the video stream, skipping the content stream into temporal alignment with the video stream.

38. A computer program product as recited in claim 37, wherein said one other frame of the video stream is an intra frame and wherein skipping the content stream into temporal alignment with the video stream includes:

skipping within the content stream to a script page closest to the intra frame that is no further ahead than the intra frame; and executing the script page until the content stream is aligned with the video stream.

39. A computer program product as recited in claim 37, wherein skipping comprises fast-forwarding.

40. A computer program product as recited in claim 37, wherein skipping comprises rewinding.

* * * * *